CONTROL APPARATUS

Filed Aug. 2, 1967

INVENTORS
PAUL W. RICE
JOHN L. MATTHEWS
BY
Bruce C Lutz
ATTORNEY

United States Patent Office 3,524,075
Patented Aug. 11, 1970

3,524,075
CONTROL APPARATUS
John L. Matthews and Paul W. Rice, Clearwater, Fla., assignors to Honeywell Inc., Minneapolis, Minn., a corporation of Delaware
Filed Aug. 2, 1967, Ser. No. 657,966
Int. Cl. H03k 5/20
U.S. Cl. 307—235 4 Claims

ABSTRACT OF THE DISCLOSURE

A circuit for detecting and sampling the extremities of an input signal. A delayed replica of the input signal is compared with the input signal, producing a third signal which changes polarity when the input signal passes through an extremity. The third signal is shaped (squared), differentiated, processed, and shaped again; the resulting pulses are applied to a sampling switch which then closes and applies the input signal to an analog-digital converter. The pulses are applied to the sampling switch only if the input signal is greater than some predetermined magnitude.

SUMMARY OF THE INVENTION

In various applications it is necessary or desirable to locate maximum and minimum points of a signal. One example is where a speech signal or a similar signal is being encoded for transmission. The signal can be encoded by taking samples at predetermined points in time such as, for example, in pulse code modulation. Alternatively, the signal can be encoded by sampling only at the maximum and minimum points of the signal waveform and by encoding the samples. An article by M. V. Mathews, "Extremal Encoding for Speech Transmission," IRE Transactions on Information Theory, September 1959, pp. 129–136, illustrates encoding a speech signal by sampling at the maximum and minimum points and encoding the samples.

In general, the prior art method of determining maximum and minimum points is by differentiating the input signal. When the derivative is equal to zero, the signal is either at a maximum or a minimum point. In encoding speech signals the frequencies of interest are, for example, approximately 300 Hertz to 3,000 Hertz. However, since differentiators are narrow band devices, it is virtually impossible to design a differentiator which will conveniently differentiate over this entire frequency range.

This invention overcomes the limitations of the prior art by providing a method of determining maximum and minimum points of an input signal without the direct use of a differentiator. For the purposes of this specification the maximum and minimum points of a signal are defined as the extremities of the signal which is further defined as the points of a signal waveform where the derivative of the signal is zero. The input signal is applied to a differential amplifier and to a delay circuit. The output signal from the delay circuit is a replica of the input signal delayed in time, and it is applied to a second input of the differential amplifier. Thus, inputs to the differential amplifier are the input signal and the input signal with a small delay introduced. The output of the differential amplifier changes polarity at each maximum and minimum point of the input signal. Thus, the zero crossing points of the output signal from the differential amplifier are indicative of the maximum and minimum points of the input signal.

Accordingly, it is an object of this invention to provide a new and novel means for determining when a signal reaches a maximum or minimum point.

Figure 1:
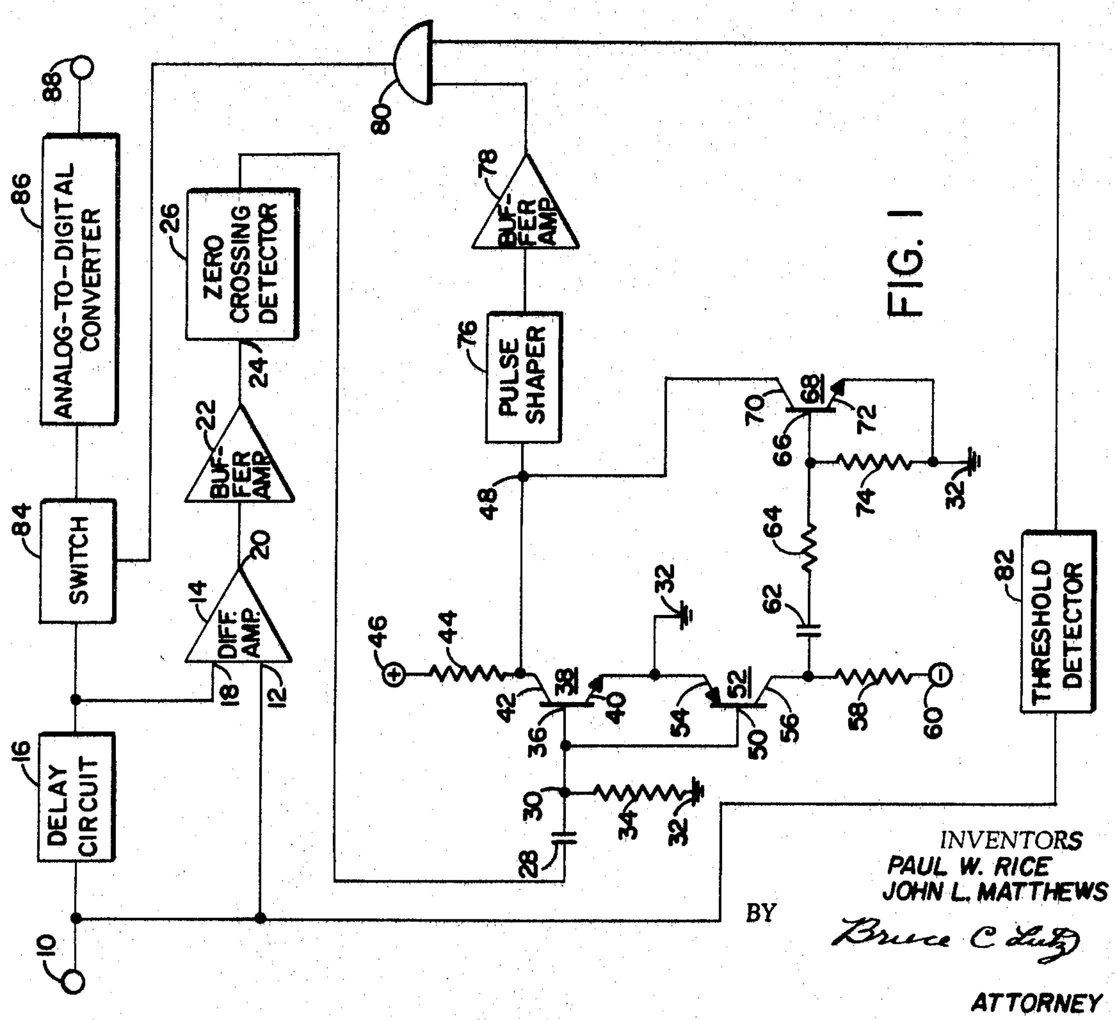

Other objects and advantages of this invention will become evident to those skilled in the art upon a reading of this specification and the appended claims in conjunction with the drawings, of which:

FIG. 1 is a block and schematic diagram of this invention; and

Figures 2A, 2B, 2C:
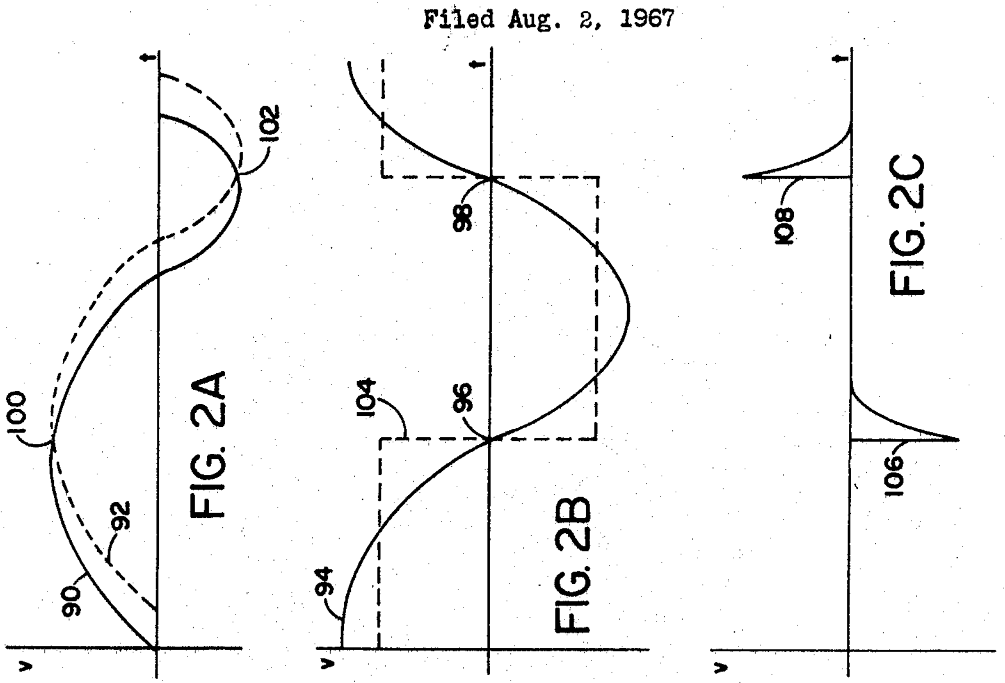

FIGS. 2A, 2B, and 2C illustrate various waveforms to aid in explaining FIG. 1.

DETAILED DESCRIPTION OF THE INVENTION

In FIG. 1 there is shown an input means or terminal 10 connected to a first input means 12 of a summing means, difference means, or differential amplifier 14. Input terminal 10 is also connected to an input of a delay means or circuit 16 which has an output connected to a second input means 18 of differential amplifier 14. Differential amplifier 14 has an output means 20 which is connected to an input of a buffer amplifier 22. Buffer amplifier 22 has a gain of one and is used to drive the following circuitry. An output of buffer amplifier 22 is connected to an input 24 of a squaring means or a zero crossing detector 26. Zero crossing detector 26 is a circuit which provides a square wave output the polarity of which is determined by the polarity of the input signal. For example, zero crossing detector 26 can be a Schmitt trigger or similar circuit which squares an input signal.

An output of zero crossing detector 26 is connected to one side of a capacitor 28 the other side of which is connected to a junction point 30. Junction point 30 is connected to a common conductor or ground 32 by means of a resistor 34. Junction point 30 is further connected to a base 36 of a transistor 38. Transistor 38 has an emitter 40 connected to ground 32 and a collector 42 connected by means of a resistor 44 to a source of positive potential 46. Collector 42 is further connected to a junction point 48. Junction point 30 is further connected to a base 50 of a transistor 52. Transistor 52 has an emitter 54 connected to ground 32 and a collector 56 connected by means of a resistor 58 to a source of negative potential 60. Collector 56 is further connected by a series connection of a capacitor 62 and a resistor 64 to a base 66 of a transistor 68. Transistor 68 has a collector 70 connected to junction point 48 and an emitter 72 connected to ground 32. Base 66 of transistor 68 is connected to ground 32 by means of a resistor 74. Transistors 38 and 68 are shown as NPN transistors while transistor 52 is shown as a PNP transistor. The designation of particular transistor types is not to be considered as limiting the scope of this invention.

Junction point 48 is connected to an input of a pulse shaper 76. Pulse shaper 76 may be a one-shot or monostable multivibrator which converts the pulses from transistors 38 and 68 into square pulses of predetermined length. An output of pulse shaper 76 is connected to an input of a buffer amplifier 78 which has an output connected to an input of an AND gate 80.

Input terminal 10 is connected to an input of a threshold detector 82 which has an output connected to a second input of AND gate 80. Threshold detector 82 may be, for example, a Schmitt trigger or similar circuit which changes state when a signal applied thereof exceeds a predetermined magnitude.

AND gate 80 has an output connected to an input of a switch 84 which may be a simple transistor switch such as an FET. The output of delay circuit 16 is connected to a second input of switch 84 and an output of switch 84 is connected to analog-to-digital converter 86 which has an output connected to an output terminal 88.

To understand the operation of this invention, assume that a signal represented by waveform 90 of FIG. 2A is present at input terminal 10. As long as the input signal is less than a level determined by the setting of threshold detector 82, threshold detector 82 will provide a "zero" output signal which will inhibit AND gate 80 so that pulses from buffer amplifier 78 will not be transmitted through gate 80. Once the input signal exceeds the predetermined threshold level, threshold detector 80 changes states so that it provides a "one" output signal which enables AND gate 80. The purpose of threshold detector 82 is to prevent the circuit from triggering due to noise and very low amplitude signals. For the remaining explanation of this invention, it will be assumed that threshold detector 82 is in its "one" state.

Waveform 90 is applied to the input of delay circuit 16 and to input 12 of differential amplifier 14. Delay circuit 16 can be any circuit which delays an input signal by a predetermined amount. For example, a delay line could be used together with an amplifier to compensate for the delay line attenuation. Alternatively, an active RC delay circuit could be used. The output signal of delay circuit 16 is illustrated in FIG. 2A as waveform 92. Waveform 92 is applied to input terminal 18 of differential amplifier 14. Differential amplifier 14 provides an output signal at output 20 which is illustrated by waveform 94 of FIG. 2B. Note that waveform 94 is equal to zero at points 96 and 98. Point 96 occurs when waveforms 90 and 92 are equal to each other at point 100 and point 98 on waveform 94 occurs when waveforms 90 and 92 are equal to each other at point 102. Waveform 94 is buffered by buffer amplifier 22 which drives zero crossing detector 26. Zero crossing detector 26 provides a square wave output illustrated by waveform 104 on FIG. 2B. Waveform 104 is merely a squared version of waveform 94. Waveform 104 is applied to capacitor 28 which together with resistor 34 comprises an elementary differentiator. When waveform 104 goes from a positive or high level to a negative or low level, a negative going spike or pulse appears at junction point 30. This negative going pulse is illustrated by pulse 106 of FIG. 2C. When the output square wave from zero crossing detector 26 goes from a negative or low level to a positive or high level, a positive spike or pulse 108 appears at junction point 30. Thus, negative pulses at junction point 30 correspond to maximum points of the input signal and positive pulses at junction point 30 correspond to minimum points of the input signal.

Negative pulse 106 switches transistor 52 ON so that collector 56 rises from a negative potential to ground. This rise in potential is coupled through capacitor 62 to switch transistor 68 ON. Ordinarily, junction point 48 is held at a positive potential by source 46. When transistor 68 switches ON, junction point 48 drops to approximately ground potential. When pulse 106 ends, transistor 52 is turned OFF thereby turning transistor 68 OFF. Thus, a negative pulse at junction point 30 causes a negative going pulse to be generated at junction point 48.

Positive pulse 108 switches transistor 38 ON thereby causing collector 42 to go from a positive potential to approximately ground. Junction point 48 also goes from a positive potential to approximately ground potential. When pulse 108 ends, transistor 38 switches OFF whereby raising the potential of collector 42 and junction point 48. Thus, it is seen that both positive and negative pulses at junction point 30 cause negative going pulses to be formed at junction point 48.

The pulses at junction point 48 cause pulse shaper 76 to trigger to provide output pulses of a predetermined amplitude and duration. These pulses are transmitted through buffer amplifier 78 and AND gate 80 to switch 84. The pulses from AND gate 80 close switch 84 so that the output signal from delay circuit 16 is transmitted through switch 84 to the input of analog-to-digital converter 85 which digitizes or encodes the output signal of delay circuit 16 and provides a digital output signal at terminal 88. The length of time that switch 84 is closed depends upon the width of the output pulses from pulse shaper 76. Note that waveform 90 could also be used to generate the sample by connecting input terminal 10 to the input of switch 84 and disconnecting the output of delay circuit 16 from the input of switch 84. This can be done with a pair of single pole-single throw switches 15 and 17. However, point 100 on waveforms 90 and 92 and point 96 on waveform 94 occur after the maximum point on waveform 90. Similarly, point 98 occurs after the minimum point on waveform 90. Thus, if the samples were taken from waveform 90, the sample points will occur after the maximum and minimum points on waveform 90. Furthermore, the circuitry will introduce a slight delay so that the samples will actually be taken after points 100 and 102. By taking the samples from waveform 92, the sample points will be more nearly at the maximum and minimum points of the waveform.

In summary, this invention receives an input signal and applies the input signal and a delayed representation of the input signal to a differential amplifier. The output of the differential amplifier is squared. The trailing edge of the square pulse occurs just after a maximum occurs on the input signal and just before the same maximum occurs on the delayed representation of the input signal. The leading edge of the squared pulses occurs just after a minimum point on the input signal and just before the same minimum point on the delay representation of the input signal. Pulses are generated corresponding to the leading and trailing edges of the squared waveform or pulses. These pulses correspond to maximum and minimum points on the input signal and on the delayed representation of the input signal. These pulses are used to activate circuitry to take samples of the input signal or of the delayed representation of the input signal, which samples correspond to the maximum or minimum amplitudes of the signal.

While we have illustrated and described one embodiment of our invention, various modifications will be evident to those skilled in the art. Accordingly, we do not wish to be limited by the specific embodiment shown and described but only by the scope of the appended claims.

We claim as our invention:

1. Apparatus of the class described comprising, in combination:
  input means for providing an input signal;
  delay means connected to said input means, receiving said input signal, and providing a delayed, continuous signal which is a replica of said input signal except that it is delayed in time;
  summing means connected to said input means and to said delay means for forming a difference signal indicative of the difference between said input signal and said delayed replica of the input signal; and
  means connected to said summing means for determining when said difference signal changes polarity, including squaring means connected to said summing means for squaring the waveform of said difference signal, and pulsing means connected to said squaring means for providing pulses at the leading and trailing edges of the signal from said squaring means.

2. Apparatus as defined in claim 11 in combination with:
  switch means connected to one of said input means and said delay means and further connected to said pulsing means whereby pulses from said pulsing means close said switch means to sample the amplitude of the signal applied thereto; and,
  output means connected to said switch means for receiving signals therefrom.

3. Apparatus for sampling a signal at the extremities of the signal comprising, in combination:
  input means for providing an input signal;
  delay means connected to said input means for providing a delayed, continuous replica of the input signal;
  means connected to said input means and to said delay means for providing pulses when the difference between the input signal and the delayed signal changes polarity;
  means connected to said input means and connected to receive said pulses, gating said pulses when the magnitude of the input signal is greater than a predetermined quantity;

switch means connected to receive said delayed replica of the input signal and further connected to said means for providing gated pulses whereby said gated pulses close said switch to provide a sample of the signal applied to said switch.

4. Apparatus for sampling the extremities of an input signal, comprising:

terminal means for receiving the input signal which is to be sampled;

means for delaying the received input signal, the resulting delayed signal being a continuous replica of the input signal;

means for generating a signal representing the difference of the received input and delayed signals;

means for squaring the waveform of the difference signal;

means for differentiating the squared difference signal, the resulting differentiated signal comprising a first series of pulses of both polarities;

means for converting the first series of pulses of both polarities to a second series of pulses of a single polarity;

means for sampling the delayed signal, the sampling occurring when pulses of the second series are applied to the sampling means;

means for generating an enable signal when the magnitude of the signal to be sampled exceeds a predetermined quantity; and, means connected to receive the second series of pulses and the enable signal, and apply the second series of pulses to the sampling means only when an enable signal is present.

References Cited

UNITED STATES PATENTS

| | | | |
|---|---|---|---|
| 3,094,666 | 6/1963 | Smith | 328—110 X |
| 3,116,458 | 12/1963 | Margopoulos | 328—135 |
| 3,315,168 | 4/1967 | Cantella | 307—235 X |

JOHN S. HEYMAN, Primary Examiner

R. C. WOODBRIDGE, Assistant Examiner

U.S. Cl. X.R.

307—232; 328—110, 115, 135, 146, 150, 151